United States Patent [19]

Mine et al.

[11] Patent Number: 5,515,274

[45] Date of Patent: May 7, 1996

[54] METHOD AND SYSTEM FOR CONTROLLING ACTIVE SUSPENSIONS OF A VEHICLE

[75] Inventors: Atsushi Mine, Ashikaga; Katsuyoshi Kamimura, Sano; Yutaka Hiwatashi, Gunma, all of Japan

[73] Assignee: Fuji Jukogyo Kabushiki Kaisha, Tokyo, Japan

[21] Appl. No.: 327,445

[22] Filed: Oct. 21, 1994

Related U.S. Application Data

[63] Continuation of Ser. No. 761,474, Sep. 18, 1991, abandoned.

[30] Foreign Application Priority Data

Sep. 27, 1990 [JP] Japan ................................. 2-257849

[51] Int. Cl.[6] .............................. G06F 7/70; B60G 11/26
[52] U.S. Cl. ................................ 364/424.05; 364/426.01; 280/707; 280/840; 280/714
[58] Field of Search ........................... 364/424.05, 424.01; 280/703, 707, 714, 840, 709, 6.11, 708, 702; 307/10.1; 180/41

[56] References Cited

U.S. PATENT DOCUMENTS

| | | | |
|---|---|---|---|
| 4,693,493 | 9/1987 | Ikemoto et al. | 280/707 |
| 4,797,823 | 1/1989 | Ikemoto et al. | 364/424.05 |
| 4,803,627 | 2/1989 | Yasuike et al. | 364/424.05 |
| 4,807,128 | 2/1989 | Ikemoto et al. | 364/424.05 |
| 4,809,176 | 2/1989 | Oowa et al. | 364/424.05 |
| 4,821,188 | 4/1989 | Ikemoto et al. | 364/424.05 |
| 4,852,906 | 8/1989 | Buma et al. | 280/707 |
| 4,856,798 | 8/1989 | Buma et al. | 280/707 |
| 4,869,528 | 9/1988 | Buma et al. | 280/707 |
| 4,905,783 | 3/1990 | Bober | 180/142 |
| 4,948,166 | 8/1990 | Kaneko | 280/707 |
| 5,013,067 | 5/1991 | Mine et al. | 364/424.05 |
| 5,029,328 | 7/1991 | Kamimura et al. | 364/424.05 |
| 5,033,770 | 7/1991 | Kamimura et al. | 364/424.05 |
| 5,044,661 | 9/1991 | Kawabata | 364/424.05 |
| 5,044,662 | 9/1991 | Kawabata | 280/707 |
| 5,063,512 | 11/1991 | Kamimura et al. | 364/424.05 |
| 5,088,761 | 2/1992 | Takehara et al. | 364/424.05 |
| 5,090,727 | 2/1992 | Kii et al. | 280/707 |
| 5,103,396 | 4/1992 | Hiwatashi et al. | 364/424.05 |
| 5,113,345 | 5/1992 | Mine et al. | 364/424.05 |
| 5,144,559 | 9/1992 | Kamimura et al. | 364/424.05 |
| 5,159,554 | 10/1992 | Buma et al. | 364/424.05 |
| 5,208,749 | 5/1993 | Adachi et al. | 364/424.05 |

FOREIGN PATENT DOCUMENTS

| | | |
|---|---|---|
| 114757 | 8/1984 | European Pat. Off. . |
| 2-95911 | 4/1990 | Japan . |
| 2-124310 | 5/1990 | Japan . |

*Primary Examiner*—Kevin J. Teska
*Assistant Examiner*—Jacques H. Louis-Jacques
*Attorney, Agent, or Firm*—Beveridge, DeGrandi, Weilacher & Young

[57] ABSTRACT

An active suspension system of a vehicle has a feed back control system for controlling four suspensions for the four wheels to maintain a reference vehicle height responsive to detected vertical relative displacements between the wheels and the vehicle body at said suspensions, and a feed forward control system for controlling the suspension to maintain an intended rolling of the vehicle responsive to detected lateral acceleration. There is further provided a circuit for changing the reference vehicle height which is responsive to the absolute value of the detected lateral acceleration, and operates to reduce the reference vehicle height with increase of the absolute value so that the vehicle body is lowered while the rolling is maintained whereby a better driver's sensation during a vehicle turn is obtained and the capability of turning of the vehicle is improved.

12 Claims, 5 Drawing Sheets

METHOD AND SYSTEM FOR CONTROLLING ACTIVE SUSPENSIONS OF A VEHICLE

This application is a continuation of application Ser. No. 07/761,474, filed Sep. 18, 1991 now abandoned, which application is entirely incorporated herein by reference.

BACKGROUND OF THE INVENTION

The present invention relates to a method and a system for controlling active suspensions of a vehicle.

A known active suspension system of a vehicle comprises suspensions into and out of which a fluid is charged and discharged independently to maintain a reference vehicle height by extending and contracting the suspensions responsive to vertical relative displacements between the wheels and the vehicle body at the positions of the respective suspensions.

Japanese Patent Application Laid-Open Pub. No. 2-95,911 discloses an active suspension system as described above wherein there are provided a longitudinal G-sensor for detecting longitudinal acceleration being applied to the vehicle and a lateral G-sensor for detecting lateral acceleration being applied to the vehicle. In the system, the degrees of pitching and rolling of the vehicle are preestimated responsive to the longitudinal and lateral accelerations detected during acceleration, deceleration and turning of the vehicl. The prestimation is performed by charging and discharging quantities of fluid into and out of the respective suspensions to suppress pitching and rolling of the vehicle.

Japanese Patent Application Laid-Open Pub. No. 2-124,310 discloses an active suspension system as described above, wherein there is further provided a switch for selecting the direction and degree of rolling of the vehicle during a turn thereof. In the system, the charging and discharging of the fluid into and out of the respective suspensions are so controlled as to keep the vehicle at an optimum rolling angle based upon the lateral acceleration and the selected direction and the degree of rolling.

The active suspension systems described above have a feed back control system for controlling the suspensions so as to maintain a reference vehicle height responsive to relative vertical displacements between the respective wheels and the vehicle body. The active suspension systems have, in addition to the feed back control system, a feed forward control system for maintaining preestimated vehicle rolling and pitching responsive to longitudinal and lateral accelerations detected during vehicle acceleration, deceleration and turning. By combining the feed forward control system with the feed back control system, the attitude of the vehicle is maintained at a desired attitude without delay.

However, the known active suspension systems described above have a disadvantage in that the driver is caused to feel an unnatural feeling or sensation of being pressed from the forward side because contraction of the suspension of the outer wheel is set to be very small or zero.

SUMMARY OF THE INVENTION

It is an object of the present invention to eliminate the disadvantages mentioned above and to provide a method and a system for controlling active suspensions of a vehicle which gives the driver a comfortable sensation during a turn.

According to an aspect of the present invention, there is provided a method for controlling active suspensions of a vehicle, comprising the steps of detecting vertical relative displacements between a vehicle body and respective wheels of the vehicle, controlling charging and discharging of a fluid into and out of respective fluid suspensions for the respective wheels to extend and contract the suspensions independently so as to maintain the suspensions at a reference vehicle height, responsive to the detected vertical relative displacements, detecting lateral acceleration being applied to the vehicle, and controlling said charging and discharging of the fluid so as to maintain rolling of the vehicle at a predetermined value, responsive to the detected lateral acceleration, said method further comprising the steps of reducing the reference vehicle height, as the absolute value of the detected lateral acceleration increases, and lowering the vehicle body while the rolling of the vehicle is maintained at said predetermined value.

According to another aspect of the present invention, there is provided a system for controlling active suspensions of a vehicle, comprising fluid suspensions provided for respective wheels, means for charging and discharging a fluid into and out of the respective fluid suspensions to extend and contract the suspensions independently, suspension stroke sensors provided for the respective wheels to detect vertical relative displacements between a vehicle body and the respective wheels, feed back control means responsive to the relative displacements detected by the suspension stroke sensors for independently controlling said means for charging and discharging so as to maintain said suspensions to have a reference vehicle height, a lateral G-sensor for detecting lateral acceleration applied to the vehicle, and feed forward control means responsive to the lateral acceleration detected by the lateral G-sensor for independently controlling said means for charging and discharging so as to maintain rolling of the vehicle during a turn at a predetermined value, said system further comprising means responsive to the detected lateral acceleration for changing the reference vehicle height, said changing means supplying an output thereof to said feed back control means so as to reduce the reference vehicle height as the absolute value of the lateral acceleration increases, to lower the vehicle body while the rolling of the vehicle is maintained at said predetermined value.

According to the present invention, the larger the lateral acceleration during a turn of a vehicle, the more is lowered the vehicle body entirely, so that the driver does not feel to be pressed from the forward side. Moreover, the lowering of the vehicle body results in lowering the vehicle center of gravity, which causes a reduction of the rolling moment and a reduction of the amount of shift of the ground contact load of the wheels. As a result, the turning performance of the vehicle is increased and therefore the maximum permissible lateral acceleration is increased.

Preferred embodiments of the present invention will become understood from the following detailed description referring to the accompanying drawings.

DESCRIPTION OF THE PREFERRED EMBODIMENT

Figure 1:
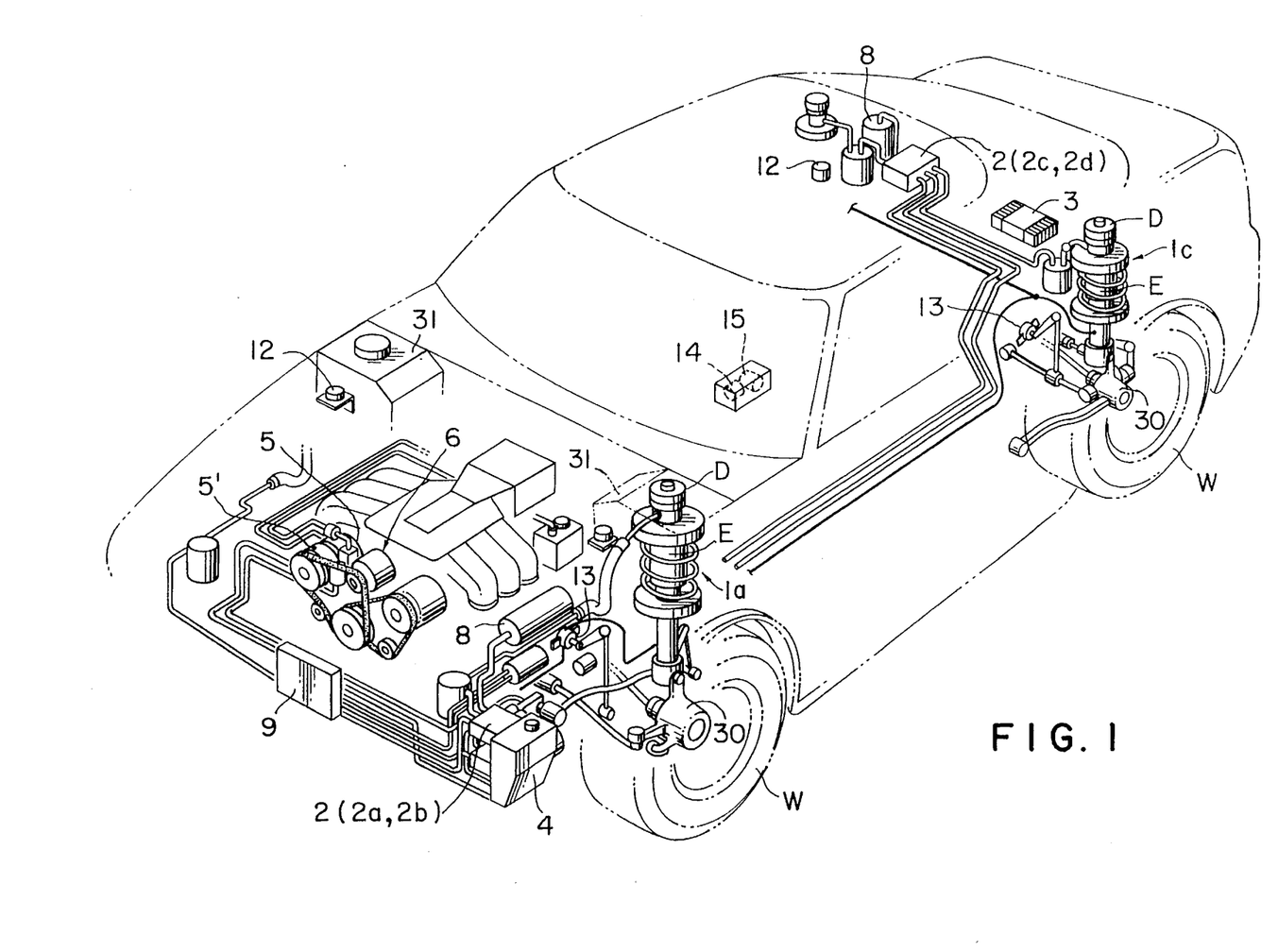
FIG. 1 is a schematic perspective view of a motor vehicle showing a layout of a system for controlling active suspensions according to the present invention.
Figure 2:
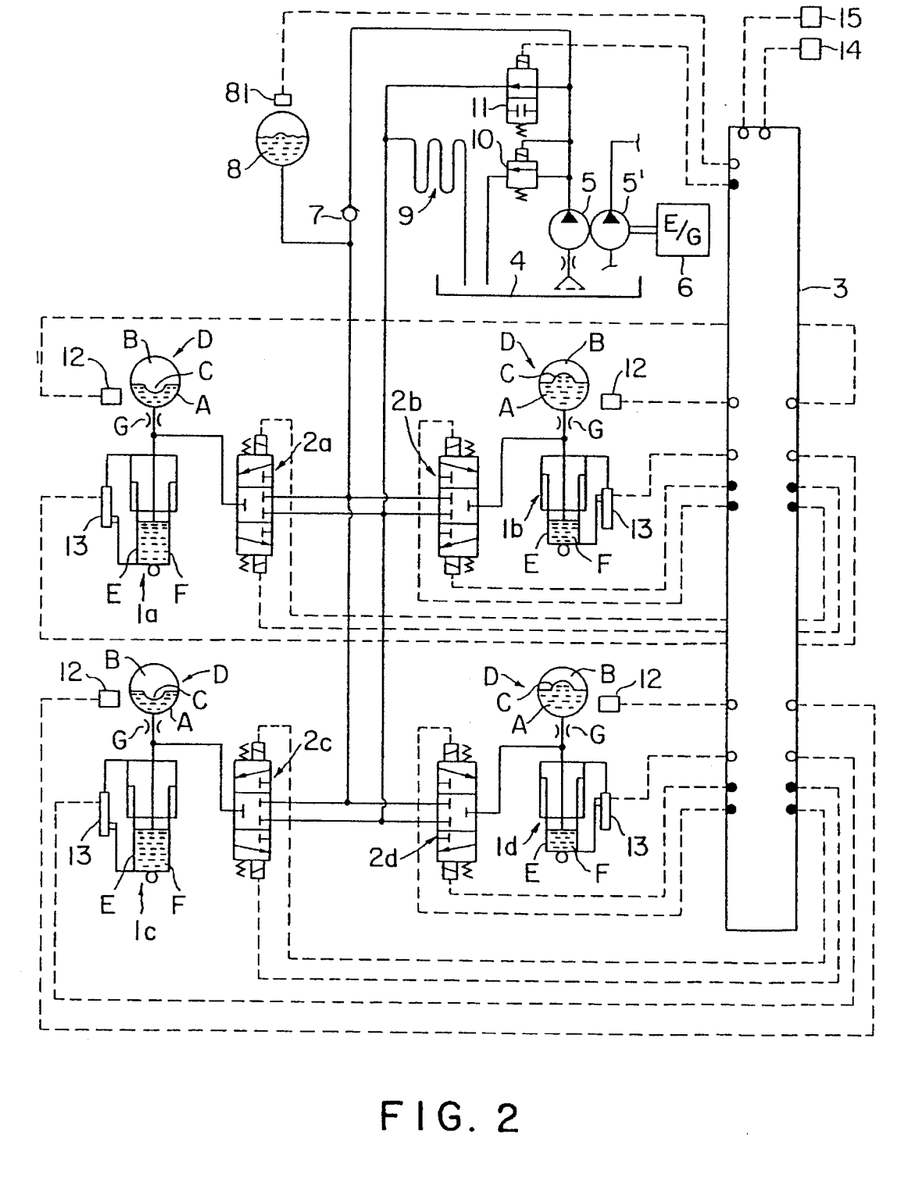
FIG. 2 is a diagram showing a hydraulic system for suspensions used in the present invention.

FIGS. 1 and 2 show an active suspension system to which the present invention may be applied. In FIG. 2, reference characters 1a and 1b indicate suspensions of left and right front wheels of a motor vehicle, and 1c and 1d indicate suspensions of left and right rear wheels. Each of the suspensions 1a, 1b, 1c and 1d is provided with a pneumatic chamber D and a hydraulic cylinder E. The chamber D has an oil chamber A and an air chamber B which are divided by a diaphragm C. The oil chamber A of the chamber D and an oil chamber F of the hydraulic cylinder E are communicated through an orifice G. As shown in FIG. 1, one end of the hydraulic cylinder E (i.e., a bottom portion of the cylinder) is connected to a suspension arm member 30 on the vehicle wheel W, and the other end (a piston rod) of the hydraulic cylinder E is connected to a member 31 of a vehicle chassis. In accordance with the load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydro-pneumatic suspension system.

There are provided control valves 2a, 2b, 2c and 2d that supply and discharge oil to and from the oil chamber F of the hydraulic cylinders E. These control valves 2a, 2b, 2c and 2d are operated independently by a valve drive signal from a controller 3 to be described later. In FIG. 1, the control valves 2a, 2b, 2c and 2d are installed separately in two groups for the front and rear suspensions.

An oil pump 5 is driven by an engine 6 to pump up oil from an oil reservoir 4 to the system. In the system shown, an oil pump 5' for power steering and the oil pump 5 are driven by the engine 6.

The oil discharged from the oil pump 5 passes through a check valve 7 and is stored in a high-pressure accumulator 8. In FIG. 1, the accumulator 8 is divided into two sections for the front and rear suspensions. When some of the control valves 2a, 2b, 2c and 2d are switched to the intake side, high-pressure oil is supplied through the control valves that have been switched to the intake side, i.e., to the oil chamber F of the suspensions 1a, 1b, 1c and 1d. When some of the control valves 2a, 2b, 2c and 2d are switched to the discharge side, oil is discharged from the oil chambers F of the suspensions 1a, 1b, 1c and 1d and the oil passes through an oil cooler 9 to flow into the oil reservoir 4.

FIG. 2 shows a relief valve 10 and a loading/unloading valve 11. When the valve 11 is switched to the unload state as indicated in FIG. 2, signals generated from the controller 3 responsive to signals from a pressure sensor 81 indicate that the high-pressure accumulator 8 has attained a predetermined pressure. When the valve 11 is switched to the unload side, the oil discharged from the oil pump 5 flows to the oil cooler 9 and then into the oil reservoir 4.

The suspensions 1a, 1b, 1c and 1d are provided with suspension stroke sensors 13 as shown in FIGS. 1 and 2. The sensor 13 detects vertical relative displacement for each suspension between the wheel and the vehicle body and input the information of the relative displacement for each of the suspensions 1a, 1b, 1c and 1d to the controller 3.

In order to detect behaviors of the vehicle, there are provided a vertical G-sensor 12 to detect vehicle vertical acceleration (vertical G), a lateral G-sensor 15 to detect vehicle lateral acceleration (lateral G) and a longitudinal G sensor 14 to detect vehicle longitudinal acceleration (longitudinal G). The lateral G-sensor 15 derives lateral acceleration based upon signals from a vehicle speed sensor and a steering angle sensor. Or the lateral acceleration is computed from detected steering torque and steering assisting force. The positions where the G-sensors 12, 14 and 15 are installed are as indicated in FIG. 1. Signals of the sensors 12, 13, 14 and 15 are inputted to the controller 3. Responsive to the signals, the controller 3 determines control quantity of charge and discharge of oil for each suspension to send valve driving signals to the respective control valves 2a, 2b, 2c and 2d, as will be described below with reference to FIG. 3.

Figure 3:
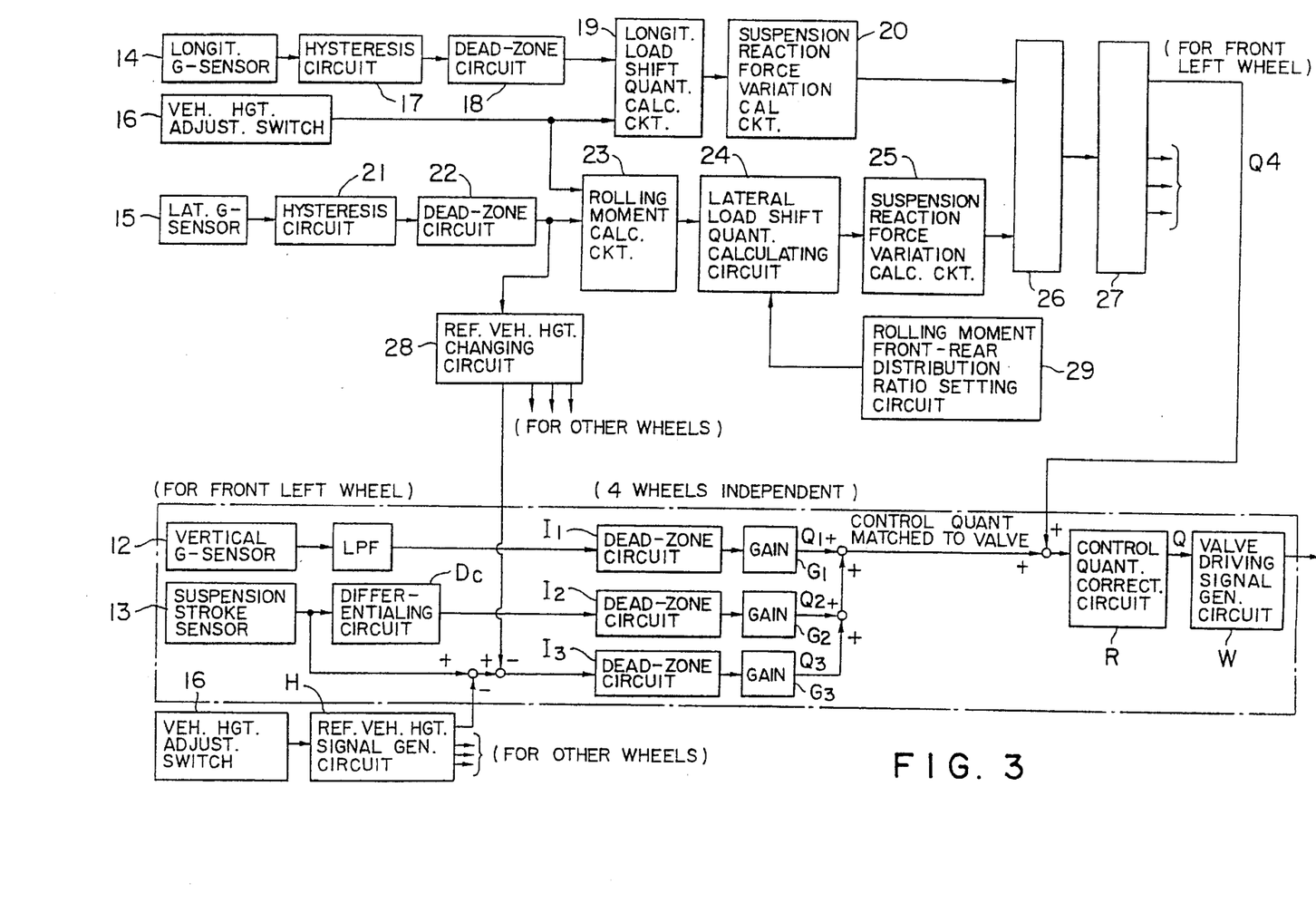
FIG. 3 is a block diagram of a first embodiment of the system according to the present invention.

In FIG. 3, the portion enclosed by a chain line is a block diagram for one of four suspensions 1a, 1b, 1c and 1d, for example, the suspension 1a of the left front wheel. While not shown in FIG. 3, a total of four sets of the same control system are provided for independently controlling the respective suspensions 1a, 1b, 1c and 1d.

In each suspension unit, the vertical acceleration and the vertical relative displacement (stroke) are respectively detected by the sensors 12 and 13. The vertical acceleration signal from the vertical G-sensor 12 is passed through a low-pass filter LPF to reduce its high-frequency component. The signal is then passed through a dead-zone circuit $I_1$ to remove a signal of a set range in the neighborhood of zero. The resulting signal is subjected to multiplication by a gain circuit $G_1$. Thus a control command quantity $Q_1$ matched to the characteristics of the corresponding control valve 2a, 2b, 2c or 2d is obtained.

The vertical relative displacement or the stroke signal from the stroke sensor 13 is inputted to a differentiating circuit Dc and a dead-zone circuit $I_3$. The signal passing through the differentiating circuit Dc is converted into a vertical relative displacement or a stroke speed signal. The speed signal passes through a dead-zone circuit $I_2$, which removes therefrom a signal fraction within a set zone in the vicinity of zero. The resulting signal is passed through a gain circuit $G_2$ to become a control command quantity $Q_2$ matched to the corresponding control valve characteristics.

By setting a vehicle height adjusting switch 16, a reference vehicle height signal is generated from a reference vehicle height generating circuit H. The reference vehicle height signal is subtracted from the vertical relative displacement signal to be inputted to the dead-zone circuit $I_3$, and an actual relative displacement signal is obtained. The actual relative displacement signal is passed through the dead-zone circuit $I_3$, where a signal fraction within a set zone in the vicinity of zero is removed therefrom. The resulting signal is passed through a gain circuit $G_3$ to become a control command quantity $Q_3$ matched to the corresponding control valve characteristic.

The control command quantity ($Q_1$, $Q_2$, and $Q_3$) matched to the characteristics of the corresponding control valve is as follows. In the case where the control valve is, for example, a flow rate control valve, the control command quantity is the length of opening time or opening degree of the valve, necessary to obtain a required quantity of hydraulic oil to be charged or discharged. The length of the valve opening time or the valve opening degree is determined with consideration of the valve opening-closing characteristics.

The three control command quantities $Q_1$, $Q_2$, and $Q_3$ are added as shown. The resulting sum of the quantities is passed through a control quantity correction circuit R to be converted into a corrected command quantity Q corrected according to environmental conditions such as temperature and pressure loss due to the length of piping. The corrected quantity Q is passed through a valve driving signal generating circuit W, which thereupon generates a control valve opening/closing signal. Thus, the control valve 2a is switched to the oil charging side or the discharge side. As a result, charging or discharging of oil of the command quantity into or out of the suspension 1a is accomplished.

In the control operation described above, when vertical acceleration is detected, oil within the suspension 1a, for example, is discharged responsive to upward acceleration. For downward acceleration, oil is charged into the suspension 1a. Soft and high-attenuation suspension characteristics are created by such control operation, with respect to forces from below such as a bump or thrust from the road surface. With respect to forces from above (i.e., from the vehicle body), apparently hard suspension characteristics are created so as to maintain the vehicle height at the reference vehicle height due to the control responsive to the vertical stroke speed and the vertical stroke, by controlling the charge and discharge of the oil.

Furthermore, the control system does not react to vibrations in the high-frequency region in resonance of the mass below the suspensions by passing the vertical acceleration signal through the low-pass filter LPF but responds to vibrations of low-frequency region in resonance of the mass above the suspensions. Accordingly, the control system can avoid bouncing so as to improve the driveability, thus preventing waste of energy for the control.

The vehicle height adjusting switch 16 is a change-over switch for changing over, for example, from normal vehicle height to high vehicle height. When normal vehicle height is selected, the reference vehicle height signal generating circuit H generates a low reference vehicle height signal. When the vehicle height adjusting switch 16 is changed over to the side of the high vehicle height, the reference vehicle height signal generating circuit H generates a high reference vehicle height signal.

The control responsive to the vertical stroke signal from the sensor 13 functions to maintain the vehicle height at the reference vehicle height. Therefore, when the reference vehicle height is switched from the normal reference vehicle height to the high reference vehicle height, the control command quantity $Q_3$ is generated for charging the oil. Thus oil is charged into the suspension 1a, for example, thereby to raise the vehicle height at the high reference vehicle height. When the vehicle height adjusting switch 16 is returned to the side of the normal vehicle height, the control command quantity $Q_3$ is generated for oil discharge. Thus, the oil within the suspension 1a is discharged. As a consequence, the vehicle height is lowered to the normal reference vehicle height. The discharging and charging of oil are simultaneously carried out for all the suspensions by the switching operation of the wheel height adjusting switch 16.

In addition to the control in the state of normal driving state, control is necessary also when a large acceleration is suddenly applied in the longitudinal direction or the lateral direction of the vehicle at the time of sudden braking, abrupt acceleration, or sudden turning. In such a case, prompt and positive control of the vehicle attitude without delay is required. For this purpose, there is provided a control system based on the detection signals from the longitudinal G-sensor 14 and the lateral G-sensor 15.

More specifically, as shown in FIG. 3, the longitudinal acceleration signal detected by the longitudinal G-sensor 14 is passed through, and converted by a hysteresis circuit 17 and a dead-zone circuit 18. By the hysteresis and dead-zone circuits 17 and 18, the longitudinal acceleration signal is converted to attain a control which does not respond to longitudinal G fluctuations of an ordinary order during normal driving but responds to large pitching of the vehicle body at the time of full acceleration or of braking with greater degree than medium. The signal thus converted is then introduced into a circuit 19 for calculating a longitudinal load shift quantity.

The calculating circuit 19 operates to calculate the load shift quantity in the longitudinal direction, responsive to the input signal fed thereto by previously stored data of vehicle types, and information on the present height of the vehicle center of gravity above the ground determined from the vehicle height adjusting switch 16.

The calculated result is transmitted to a circuit 20 for calculating variation of suspension reaction force. The calculating circuit 20 operates to calculate the variation of the suspension reaction force, which may arise from the load shift quantity at each position of the suspension, with consideration of driving force and braking force acting on the tires responsive to the information thus fed thereto and other information such as the type of the suspensions and the driving type (front-wheel drive, rear-wheel drive, four-wheel drive, etc.).

Similarly, as in the case of the longitudinal G-sensor 14, the lateral acceleration detected by the lateral G-sensor 15 is also passed through a hysteresis circuit 21 and a dead-zone circuit 22. Thus, the control avoids to respond to minute lateral G-fluctuations occurring during normal driving. In this manner, only a signal above a predetermined value is inputted to a circuit 23 for calculating the rolling moment and to a circuit 28 for changing the reference vehicle height.

Figure 4:
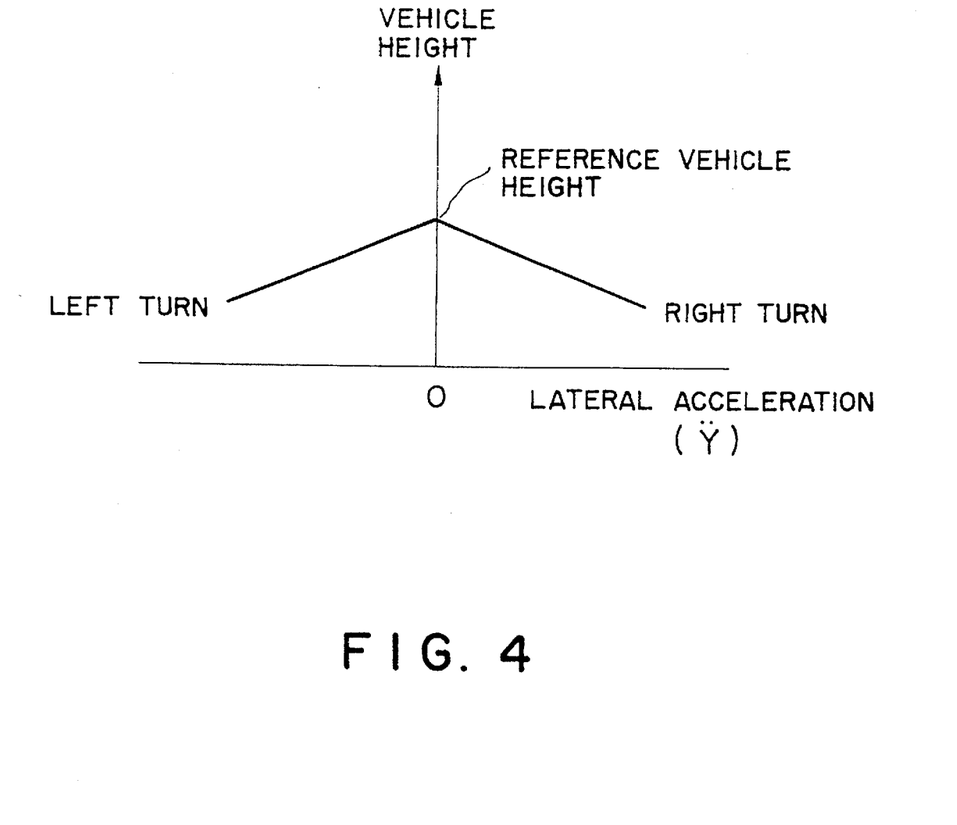
FIG. 4 is a graph indicating an example of relationship between detected lateral acceleration and reference vehicle height to be changed.

The changing circuit 28 has a function to change the reference vehicle height in accordance with the signal inputted thereto, in a manner indicated in FIG. 4. More specifically, as the absolute value of the inputted signal of the lateral acceleration $\ddot{Y}$ increases, the value of output signal from the circuit 28 is changed to decrease the reference vehicle height. The reference vehicle height is decreased linearly in the case of FIG. 4. The output signal from the circuit 28 is a reference vehicle height changing signal and is used to correct the actual relative displacement signal based on the signal from the suspension stroke sensor 13 and from the reference vehicle height signal generating circuit H, before the relative displacement signal is supplied to the dead-zone circuit 13. The reference vehicle height changing signal is subtracted from the actual relative displacement signal.

The calculating circuit 23 calculates from the input signal thereto the rolling moment, on the basis of the vehicle specification previously stored and information on the height of the center of gravity of the vehicle body determined by the vehicle height adjusting switch 16 and by reference vehicle height changing data corresponding to the absolute value of the lateral acceleration $\ddot{Y}$. The calculation result is transmitted to a circuit 24 for calculating a lateral load shift quantity.

The calculating circuit 24 operates to distribute the generated rolling moment inputted from the rolling moment calculating circuit 23 to the front and rear wheels and calculates the lateral load shift quantity between the left and right of the front and rear wheels, on the basis of a longitudinal rolling moment distribution ratio determined by a circuit 29 for setting the longitudinal rolling moment distribution ratio.

The resulting output of the calculating circuit 24 is fed to a circuit 25 for calculating the variation of the suspension reaction force. In the calculating circuit 25, the total lateral force acting on the wheels corresponding to the generated lateral G is distributed to the front and rear wheels based on the yaw moment equilibrium equation with the position of the center of gravity of the vehicle and the distance between the front and rear axles. Then, with consideration of the lateral load shift quantity between the front and rear wheels calculated by the calculating circuit 24, the lateral forces on the front and rear wheels, the vehicle height, and the type of the suspensions, the variation of the suspension reaction force is calculated separately for each of the front and rear suspensions.

The variation of the suspension reaction forces calculated by the calculating circuits 20 and 25 are added in a circuit 26 for calculating control quantity. The total variation of the suspension reaction force is determined for each suspension. Furthermore, the control quantity of charge and discharge of the oil matches with the total variation of the suspension reaction force for maintaining the internal pressure of each suspension. The resulting control quantity is converted into a control command quantity $Q_4$ matching with the valve specification or characteristics in a circuit 27 for converting control quantity. The converted control command quantity $Q_4$ is added to the control command quantities $Q_1$, $Q_2$, and $Q_3$. The resulting quantity is fed into a circuit R for correcting the control quantity.

When a longitudinal acceleration or a lateral acceleration is applied to a vehicle, a load shift is produced longitudinally or laterally, respectively, based on the acceleration. As a result, there occurs a vehicle attitude change in the direction of pitching, such as a nose dive or squat, and a vehicle attitude change in the direction of rolling. Therefore, a delay in controlling the vehicle attitude tends to occur if a normal feed back control is used wherein the vehicle attitude is controlled to become a normal attitude responsive to signals from a suspension stroke sensor, which detects suspension stroke changes due to longitudinal and lateral accelerations. Especially, when relatively large longitudinal or lateral acceleration is applied to the vehicle suddenly for a very short time, a delay in attitude control cannot be avoided so that the vehicle will once change in attitude and thereafter recover the normal attitude.

The delay in attitude control can be made remarkably small with precise vehicle attitude control if a feed forward control is used in addition to the feed back control. Such feed forward control comprises detecting longitudinal and lateral accelerations, calculating load shift quantities based on the detected accelerations, calculating suspension reaction variation to be produced for each suspension with consideration of braking force, driving force and lateral force to be imposed on the wheels depending upon the type of the suspensions and the type of drive, and controlling charge and discharge of oil into and out of each suspension responsive to the calculated suspension reaction variation for each suspension.

However, in the case where a reduction of the delay in control is aimed at by the addition of the feed forward control during a turn of a vehicle, the vehicle will only slightly descend on the outer wheel side during the turn so that the driver will feel an unnatural sensation of being pressed from the forward side.

In order to eliminate such an unnatural sensation, the present invention employs a control wherein, as described hereinbefore, the reference vehicle height is changed in accordance with the absolute value of the lateral acceleration $\ddot{Y}$ detected by the lateral G-sensor 15 during a vehicle turn, so as to lower the entire vehicle body. By such a control, the vehicle body will be lowered more as the lateral acceleration becomes larger in absolute value, while the vehicle body is maintained in substantially horizontal attitude. The smaller the lateral acceleration, the smaller is the degree of descending of the vehicle body. Due to such changes in the degree of lowering of the vehicle body depending upon the lateral acceleration, the unnatural sensation of being pressed from the forward side is eliminated.

Furthermore, by reducing the vehicle height depending upon the lateral acceleration during a vehicle turn, the height of the center of gravity of the vehicle above the ground will become smaller as the lateral acceleration becomes larger so that the rolling moment will be reduced with resultant reduction in the amount of shift of the ground contact load of the wheels, relative to the case of conventional control. As a result, the capability of turning of the vehicle, that is, the allowable maximum amount of lateral acceleration during a turn, is enlarged.

In the embodiment of the present invention described above, the control of reducing the reference vehicle height depending upon the amount of lateral acceleration is applied to an active suspension system which controls the rolling angle of the vehicle during a turn to be maintained at zero. However, the control of reducing the reference vehicle height depending upon the amount of lateral acceleration can be applied equally to another type of active suspension system wherein the direction and degree of vehicle rolling can be selected according to a driver's choice, as disclosed in Japanese Patent Appln. Laid-Open Pub. No. 2-124,310.

Figure 5:
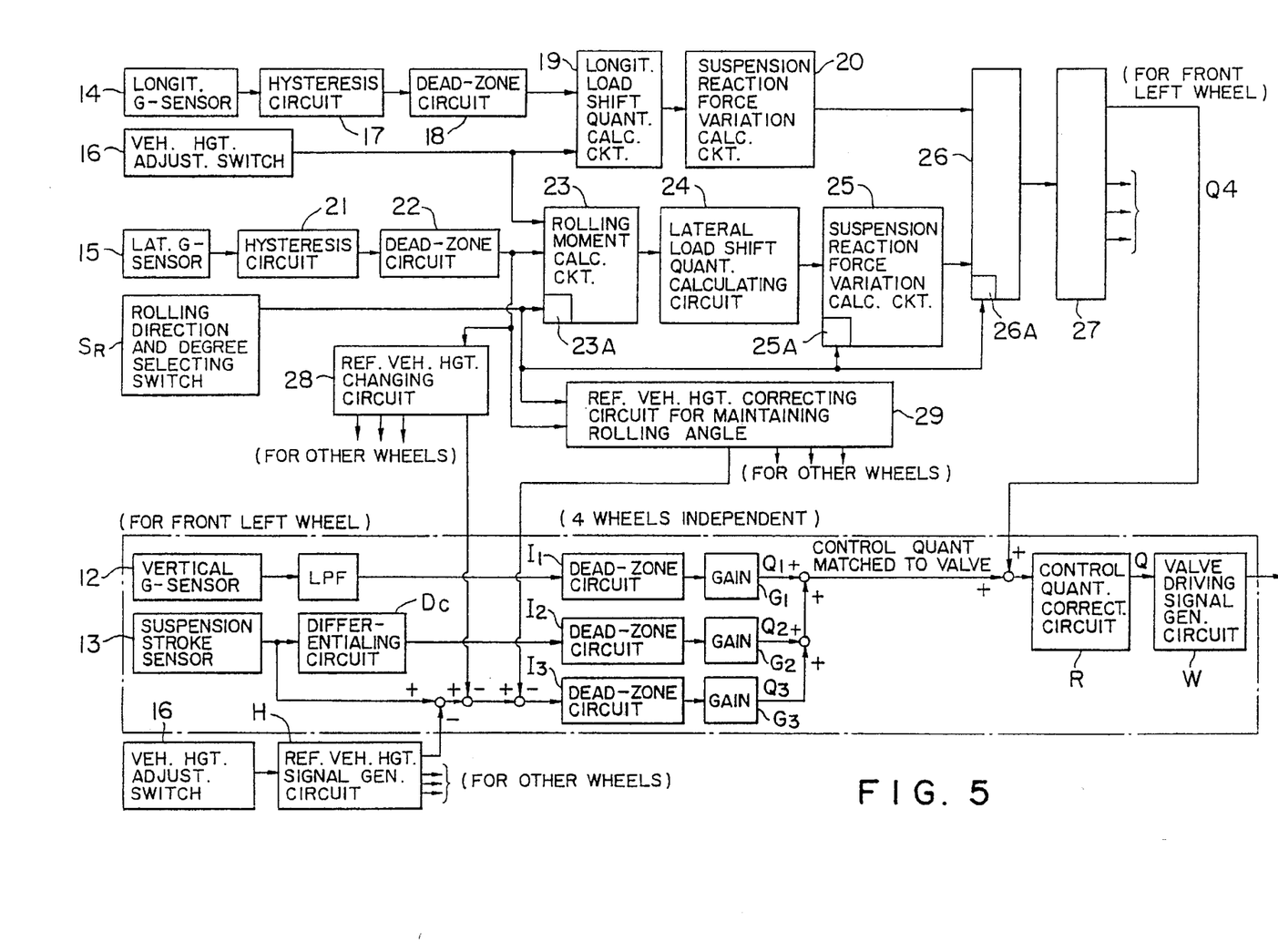
FIG. 5 is a diagram showing a second embodiment of the system according to the present invention.

FIG. 5 shows a second embodiment of the present invention wherein the control of reducing the reference vehicle height is applied to the other type of active suspension system referred to above.

In FIG. 5, the same reference numerals and characters as used in FIG. 3 designate the same elements as in FIG. 3, so that only different elements will be described below.

As shown, there is provided a switch $S_R$ for selecting rolling direction and degree. A command signal in accordance with the selected rolling direction and degree is supplied from the selecting switch $S_R$ to a correcting circuit 23A of the rolling moment calculating circuit 23. Responsive to the command signal from the switch $S_R$ and to the input signal from the lateral G-sensor 15, representing the amount of the lateral acceleration being applied to the vehicle, the correcting circuit 23A calculates a target rolling angle and a rolling moment that will be produced as a result of sidewise shift of the center of gravity of the vehicle due to a vehicle body inclination in accordance with the target rolling angle. On the basis of the calculated rolling angle and the rolling moment, the correcting circuit 23A corrects the rolling moment calculated by the rolling moment calculating circuit 23 responsive to the amount of the detected lateral acceleration, a previously stored vehicle characteristics and information of the present vehicle height.

The circuit 25 for calculating the suspension reaction force variation is provided with a correcting circuit 25A. The circuit 25A receives the command signal from the selecting switch $S_R$. Responsive to the command signal from the switch $S_R$, representing the selected rolling direction and degree, the correcting circuit 25A calculates a deformation of each suspension link that will be produced due to a set rolling angle which is given from the command signal from the selecting switch $S_R$ and the amount of the lateral acceleration. Based on the deformation of each suspension link, the correcting circuit 25A corrects the suspension reaction force variation.

Furthermore, the circuit 26 for calculating the control quantity is provided with a correcting circuit 26A. The circuit 26A receives the command signal from the selecting switch $S_R$. Responsive to the command signal from the selecting switch $S_R$, the correcting circuit 26A corrects the control quantity calculated by the calculating circuit 26, so as to produce a suspension stroke corresponding to the set rolling angle given from the command signal and the amount of the lateral acceleration.

There is further provided a circuit 29 for correcting the reference vehicle height. The output signal from the dead-zone circuit 22 and the command signal from the selecting switch $S_R$ are supplied to the circuit 29. The correcting circuit 29 calculates a correcting amount responsive to the inputted signals and outputs the correcting amount to correct the input signal to the dead-zone circuit 13, for constantly maintaining the set rolling angle.

By using the system described above, it is possible to maintain a vehicle rolling angle corresponding to rolling direction and degree selected by the selecting switch $S_R$.

According to the system described above with reference to FIG. 5, the actual suspension stroke variation signal in the feed back control system is corrected by the correction signal from the reference vehicle height changing circuit 28, responsive to the absolute value of lateral acceleration. By the correction, the reference vehicle heights for the four wheels are reduced, and the data and calculation formulae in the feed forward control system are changed to include a change in height above the ground, of the center of gravity of the vehicle due to the reference vehicle height reduction responsive to an increase in the amount of the lateral acceleration. The above control is carried out with the selected rolling direction and degree maintained.

Therefore, the driver does not feel an unnatural sensation of being pressed from the forward side. Furthermore, the amount of shift of the ground contact load of the wheels is made smaller than that in a conventional active suspension system, and the capability of turning is improved.

The present invention has been described as applied to an active suspension system using hydro-pneumatic suspensions as shown in FIGS. 1 and 2. But it is possible to apply the present invention to an active suspension system using pneumatic suspensions, wherein air or other gases are charged and discharged into and out of the suspensions and assisting dampers are employed.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A method for controlling active suspensions of a vehicle, comprising the steps of detecting vertical relative displacements between a vehicle body and respective wheels of the vehicle, controlling charging and discharging of a fluid into and out of respective fluid suspensions for the respective wheels to extend and contract the suspensions independently so as to maintain the suspensions to have a reference vehicle height, detecting lateral acceleration being applied to the vehicle with lateral acceleration detection means, and controlling said charging and discharging of the fluid so as to maintain rolling of the vehicle at a predetermined value, said method further comprising the steps of:

changing the reference vehicle height in response to the lateral acceleration detected by said lateral acceleration detection means by reducing the reference vehicle height as the absolute value of the detected lateral acceleration increases; and lowering the vehicle body while the rolling of the vehicle is maintained at said predetermined value.

2. The method according to claim 1, wherein the reference vehicle height is linearly reduced with an increase of said absolute value.

3. The method according to claim 1, wherein the reference vehicle height is gradually reduced with an increase of said absolute value.

4. A system for controlling active suspensions of a vehicle, having fluid suspensions provided for respective wheels, means for charging and discharging a fluid into and out of the respective fluid suspensions to extend and contract the suspensions independently, suspension stroke sensors provided for the respective wheels to detect vertical relative displacements between a vehicle body and the respective wheels, feed back control means responsive to the relative displacements detected by the suspension stroke sensors for independently controlling said means for charging and discharging so as to maintain said suspensions to have a reference vehicle height, a lateral G-sensor for detecting lateral acceleration applied to the vehicle, and feed forward control means responsive to the lateral acceleration for independently controlling said means for charging and discharging so as to maintain rolling of the vehicle during a turn at a predetermined value, said system further comprising:

means responsive to the detected lateral acceleration for changing the reference vehicle height, said changing means supplying an output thereof to said feed back control means so as to reduce the reference vehicle height as the absolute value of the lateral acceleration increases, to lower the vehicle body while the rolling of the vehicle is maintained at said predetermined value.

5. The system according to claim 4, further comprising:

selecting means for selecting rolling direction and degree to output a selection signal; and reference vehicle height correcting means responsive to the detected lateral acceleration and to said selection signal for calculating a correcting amount and for supplying an output corresponding to said correcting amount to said feed back control means so as to correct the reference vehicle height in a manner to constantly maintain a set rolling angle of the vehicle determined by said selected rolling direction and degree.

6. The system according to claim 5, further comprising:

calculating means responsive to the lateral acceleration for calculating and outputting a rolling moment;

computing means responsive to the rolling moment for calculating and outputting a lateral load shift quantity;

means responsive to the load shift quantity for calculating and outputting a suspension reaction force variation;

control means responsive to the suspension reaction force variation for calculating and outputting a control quantity for supplying to the feed back control means;

first correcting means responsive to the detected lateral acceleration and to said selection signal for correcting the rolling moment calculated in said rolling moment calculating means;

second correcting means responsive to said selection signal for correcting the suspension reaction force variation calculated in said suspension reaction force variation calculating means; and third correcting means responsive to said selection signal for correcting the control quantity calculated in said control quantity calculating means.

7. The system according to claim 4 wherein the reference vehicle height is linearly reduced with an increase in said absolute value.

8. The system according to claim 43 wherein the reference vehicle height is continuously reduced with an increase in said absolute value.

9. An apparatus for controlling active suspension of a vehicle, comprising:

means for detecting vertical relative displacements between a vehicle body and respective wheels of the vehicle;

means for controlling charging and discharging of a fluid into and out of respective fluid suspensions for the respective wheels to extend and contract the suspensions independently to maintain the suspensions at a reference vehicle height;

means for detecting lateral acceleration being applied to the vehicle;

means for controlling said charging and discharging of the fluid in an effort to maintain a degree of rolling of the vehicle at a predetermined value; and means for reducing the reference vehicle height in accordance with an increase in the detected value of lateral acceleration experienced by the vehicle while negotiating a curve so as to lower the vehicle body while the rolling of the vehicle is maintained at said predetermined value whereby riding comfort is improved during vehicle turning.

10. The apparatus according to claim 9 wherein the reference vehicle height is reduced linearly in accordance with an increase in an absolute value of the lateral acceleration.

11. The apparatus according to claim 9 further comprising a selection switch for selecting a rolling direction and degree setting.

12. An apparatus according to claim 9 further comprising a vehicle height adjusting switch for setting a vehicle to either a high or a low suspension setting.

* * * * *